United States Patent [19]

Kumar

[11] Patent Number: 5,321,533
[45] Date of Patent: Jun. 14, 1994

[54] POLYMER DISPERSED FERROELECTRIC SMECTIC LIQUID CRYSTAL

[75] Inventor: Satyendra Kumar, Kent, Ohio
[73] Assignee: Kent State Universtiy, Kent, Ohio
[21] Appl. No.: 950,785
[22] Filed: Sep. 24, 1992
[51] Int. Cl.⁵ .................................................. G02F 1/13
[52] U.S. Cl. ........................................ 359/51; 359/52; 359/100
[58] Field of Search .......................... 359/51, 52, 100

[56] References Cited

U.S. PATENT DOCUMENTS

| | | | |
|---|---|---|---|
| 3,600,060 | 8/1971 | Churchill et al. | 359/44 |
| 3,791,716 | 2/1974 | Borel et al. | 359/40 |
| 4,048,358 | 9/1977 | Shanks | 428/1 |
| 4,101,207 | 7/1978 | Taylor | 359/51 |
| 4,139,273 | 2/1979 | Crossland et al. | 359/77 |
| 4,148,128 | 4/1979 | Feldman | 359/80 |
| 4,367,924 | 1/1983 | Clark et al. | 359/56 |
| 4,435,047 | 3/1984 | Fergason | 359/52 |
| 4,563,059 | 1/1986 | Clark et al. | 359/76 |
| 4,671,618 | 6/1987 | Wu et al. | 359/52 |
| 4,673,255 | 6/1987 | West et al. | 359/51 |
| 4,685,771 | 8/1987 | West et al. | 359/46 |
| 4,688,900 | 8/1987 | Doane et al. | 359/52 |
| 4,728,547 | 3/1988 | Vaz et al. | 359/51 |
| 4,765,719 | 8/1988 | Fergson | 359/51 |
| 4,850,683 | 7/1989 | Kawaguchi et al. | 359/52 |
| 4,890,902 | 1/1990 | Doane et al. | 359/52 |
| 4,891,152 | 1/1990 | Miller et al. | 359/103 |
| 4,994,204 | 2/1991 | Doane et al. | 359/51 |
| 5,004,323 | 4/1991 | West et al. | 359/51 |
| 5,155,607 | 10/1992 | Inoue et al. | 359/52 |
| 5,216,530 | 6/1993 | Pearlman et al. | 359/51 |

FOREIGN PATENT DOCUMENTS 55-96922 7/1980 Japan.
1-142713 6/1989 Japan ............................ 359/51

OTHER PUBLICATIONS

Schiekel, "Deformation of Nematic Liquid Crystals with Vertical Orientation in Electrical Fields", Appl. Phys. Lett., vol. 19, pp. 391-393 (Nov. 15, 1971).
Soref et al., "Electrically Controlled Birefringence of Thin Nematic Films", J. Appl. Phys., vol. 43, pp. 2029-2037 (May 1972).
Iwasaki et al., "Colour Switching in Ferroelectric Smectic Liquid Crystal by Electric Field", Jap. J. Appl. Phys., vol. 18, pp. 2323-2324 (Dec. 1979).
Clark et al., "Submicrosecond Bistable Electro-Optic Switching in Liquid Crystals", Appl. Phys. Lett., vol. 36, pp. 899-901 (Jun. 1, 1980).
Clark, "Surface Memory Effects in Liquid Crystals: Influence of Surface Composition", Phys. Rev. Lett., vol. 55, pp. 292-295 (Jul. 15, 1985).
Wu et al., "Angular Discrimination of Light Transmission Through Polymer-Dispersed Liquid-Crystal Films", J. Appl. Phys., vol. 62, pp. 3925-3931 (Nov. 1, 1987).
Johnson et al., "Optical Interconnection Network Using Polarization-Based Ferroelectric Liquid Crystal Gates", Appl. Optics, vol. 27, pp. 1727-1733 (May 1, 1988).
West, "Phase Separation of Liquid Crystals in Polymers", Mol. Cryst. Liq. Cryst., vol. 157, pp. 427-441 (1988).

Primary Examiner—William L. Sikes
Assistant Examiner—Ron Trice
Attorney, Agent, or Firm—Watts Hoffmann Fisher & Heinke

[57] ABSTRACT

Disclosed is a class of light modulating materials comprising microdomains of ferroelectric smectic liquid crystal dispersed in a light-transmissive polymer medium. The microdomains are formed by phase separation of the liquid crystal from solution with the polymer as the polymer is solidified. The switching of the liquid crystal may be either monostable or multistable (e.g., bistable), depending on the liquid crystal and polymer. The material modulates light in either a scattering-transmissive mode or a birefringence mode. Materials operating in the scattering-transmissive mode do not require polarizers. Advantages of the materials include switching times down to the order of microseconds or less, multistable optical states, wide viewing angles and high contrast.

10 Claims, 2 Drawing Sheets

POLYMER DISPERSED FERROELECTRIC SMECTIC LIQUID CRYSTAL

TECHNICAL FIELD

The present invention relates generally to liquid crystal technology, and more specifically to the manufacture of novel ferroelectric smectic liquid crystal dispersed in a polymer matrix providing an electro-optic effect offering multistable optical states, fast switching times down to a few microseconds or less, high contrast and brightness, and wide viewing angles.

BACKGROUND OF THE INVENTION

Smectic liquid crystals are characterized by molecules which align in layers. Molecular ordering exists within each layer, with the degree of molecular ordering depending on the particular smectic phase. In chiral smectic materials, which include the chiral smectic C*, F*, I*, G* and H* phases, the ordering of the molecules within the layers rotates by a constant angle from layer to layer, so that the liquid crystal structure is twisted. For example, smectic C* phases are characterized in that the molecules align in layers in which the directors (i.e., the common directions of the long axes of the molecules within each layer) are oblique to the layer boundaries, so that the "tilt angle" of the molecules (i.e., the angle between the director and the layer normal) is the same from layer to layer. In bulk samples of smectic C* material, the directors twist from layer to layer.

Molecules of substances having chiral smectic liquid crystal phases have permanent dipole moments approximately normal to the director. The alignment of molecules of chiral smectic liquid crystal in an external electric field is determined in part by competition between the torques induced by this permanent dipole moment and by the induced dipole moment which, in materials with positive dielectric anisotropy, is parallel to the director. The smectic C*, F*, I*, G* and H* phases are all "ferroelectric" in the sense that geometry of the liquid crystal may be altered with the application of an electromagnetic field and then, under proper conditions, remains stable once the field is removed.

A number of transmissive mode displays using smectic C* phase liquid crystal have been proposed. For example, "surface-stabilized ferroelectric liquid crystal" ["SSFLC"] displays make use of thin films of smectic C* liquid crystal confined between parallel substrates. In SSFLC displays, the liquid crystal is preferably aligned in a so-called "bookshelf" geometry in which the molecules are arranged in layers that are perpendicular to the inner surfaces of the substrates and the molecules are approximately parallel along a 45° angle to the layers. The material may be switched between two stable orientations by generating external electric fields across the liquid crystal normal to the inner surfaces of the substrates. The field useful for switching the material from one orientation to another is opposite in polarity to the field useful for switching back to the first of the orientations. If the film is sufficiently thin, each orientation should be stable when the electric field is removed. The two stable orientations differ in that the directors in the two orientations form mirror images about a plane normal to the layers and to the inner surfaces of the substrates.

In one proposed SSFLC device, the liquid crystal is confined between parallel substrates which are placed between a polarizer and an analyzer. The device modulates light by controlling the polarization direction of linearly polarized light transmitted through the liquid crystal. Due to the birefringence of the liquid crystal, light incident on the liquid crystal is decomposed into two orthogonally-polarized components having different speeds. The relative advance of one of the polarized components relative to the other rotates the polarization direction of the transmitted light relative to that of the incident light to a degree dependent on the thickness of the liquid crystal film and the orientation of the director within the film.

In a preferred device, the substrates contain a film of liquid crystal having a film thickness selected to effect a 90° rotation of the polarization direction of the light incident on the liquid crystal. If the polarizer is aligned at approximately 45° with respect to the optic axis of the liquid crystal in the first of the two orientations and the analyzer is oriented parallel or perpendicular to the polarizer, the light transmission through the device is maximized or minimized in the first stable orientation of the liquid crystal. Applying an electric field to transform the liquid crystal to the second stable orientation changes the intensity of light transmitted by the device. Consequently, such an SSFLC display is bright when the liquid crystal is in one of the stable orientations and dark when the liquid crystal is in the other orientation. The optical behavior of the device may be changed by rotating the analyzer relative to the polarizer, or either the polarizer or analyzer relative to the liquid crystal.

Among the advantages attributed to displays using smectic C* liquid crystal are fast switching times, high contrast and wide viewing angles compared to commercially available liquid crystal displays such as twisted nematic displays. One application for these ferroelectric liquid crystal materials would be in computer display terminals and televisions. Most currently available flat panel displays are based on twisted nematic liquid crystal. These flat panel displays require less power than conventional cathode ray tubes, but have not replaced cathode ray tubes due to their slow response, poor contrast, low brightness and narrow viewing angle.

Displays using ferroelectric smectic C* liquid crystal may be capable of switching times on the order of microseconds or less, whereas the switching times of twisted nematic displays are often on the order of milliseconds. Existing SSFLC displays have shown viewing angles in excess of 45° and contrast ratios on the order of 1500:1, which exceed the performance of typical twist cells. Despite these advantages, SSFLC displays have not replaced cathode ray tubes due to the technical difficulty and expense of obtaining stable bookshelf alignment of the liquid crystal. Furthermore, the use of surface coatings with strong anchoring which promote alignment of the liquid crystal parallel to the substrates increases the switching voltage required to switch between stable orientations. Another disadvantage inherent in SSFLC displays is that the substrate anchoring that is necessary for bookshelf alignment is unstable; the liquid crystal may switch to light scattering "zig-zag" or "chevron" texture if jarred, rendering the display worthless. Despite intense research over the past decade, there remains a need for an economical method for aligning ferroelectric smectic liquid crystal in a geometry useful for display applications.

Flat panel liquid crystal displays using a nematic liquid crystal phase have been formed by phase separation of the liquid crystal phase from solution with a polymer or pre-polymeric resin. The earliest form of these materials comprised microdroplets of liquid crystal dispersed in a continuous polymeric matrix. In such materials, the ordinary index of refraction was matched to an index of refraction of the polymer. The material scattered light in the absence of an external field and transmitted light in the presence of an electric field. The evolution of such materials may be found in references such as U.S. Pat. Nos. 4,671,618; 4,673,255; 4,685,771; 4,688,900; 4,890,902; 5,004,323 and 5,093,735, the disclosures of which are incorporated by reference.

Three techniques have been proposed for inducing phase separation of the nematic liquid crystal phase from the polymer phase. According to a method known as "polymerization induced phase separation" or "PIPS," the liquid crystal is dissolved in a prepolymer followed by polymerization. According to another method known as "thermal induced phase separation" or "TIPS," the liquid crystal is dissolved (or redissolved) in a polymer melt followed by cooling. According to the third method, known as "solvent induced phase separation" or "SIPS," the liquid crystal and polymer are dissolved in a common solvent followed by evolution of the solvent. The polymer is often crosslinked to improve the properties of the display material. The size and density of the droplets may be varied by changing the ratios of the liquid crystal and polymer phases as well as by changing the conditions under which phase separation occurs.

While flat panel displays comprising material formed by phase separation of a nematic liquid crystal phase from solution with a polymer appear to be highly durable, as well as useful and economical for many applications, the fastest switching times for such materials remain on the order of a millisecond. Furthermore, the viewing angles for these materials can be increased beyond about 20° only through the use of specialized birefringent polymers which increase the cost of the displays. There remains a need for relatively inexpensive flat panel displays with higher switching speeds, higher contrast and larger viewing angles.

DISCLOSURE OF THE INVENTION

This invention provides a new class of liquid crystal light modulating materials comprising a ferroelectric liquid crystal phase interspersed with a light transmissive polymer phase. The new materials of the invention are characterized in part by simplicity of preparation and display fabrication, switching times on the order of microseconds, multistable switching, high contrast and wide viewing angles.

A preferred form of the material includes microdomains of ferroelectric smectic liquid crystal dispersed in a continuous matrix of light-transmissive polymer. Within the microdomains, the liquid crystal is aligned such that the optical behavior of the material changes when the material is exposed to an external electric field (AC, DC or a combination thereof) normal to a viewing surface. If the microdomains are sufficiently small, the alignment will be stable even when the light modulating material is jarred. Furthermore, bistable or multistable switching of the liquid crystal is possible if the anchoring of the liquid crystal at the boundaries of the microdomains is sufficiently weak.

According to a preferred embodiment, the material is fabricated by phase separation of a ferroelectric smectic phase from solution with a polymer or pre-polymer in the presence of a force promoting an alignment of the liquid crystal, such as shear stresses and forces generated by an external electromagnetic field or a temperature gradient. While phase separation of the liquid crystal may be induced either by the PIPS or TIPS methods, good results have been obtained by dissolving a liquid crystal having a ferroelectric smectic phase with a polymer in a solvent and then inducing phase separation by evaporation of the solvent.

Either thermosetting or thermoplastic polymers may be used, including polystyrenes, polymers of $\alpha$-methylstyrene, vinyl-toluene, isobutylene, butadiene, methylbutene, or epoxies cured with various curing agents such as thiols, alcohols and mercaptans. Birefringent polymers may be used, depending on the application.

Likewise, preferred liquid crystals include those having ferroelectric smectic phases near room temperature or another working temperature range for the material, and which are compatible with the polymer. Among these are ZLI-3654, ZLI-4003, ZLI-4005, ZLI-4140, and ZLI-4237-100 available from E. Merck of Darmstadt, Germany; SEC-13 and 842, available from BDH; a mixture of W7 and W3, each available from Displaytech; Alpha Chloro Ester (S5, R-6) available from Aldrich Chemical; and a material with the structural formula $C_2H_5$—$CCH_3H$—$CCIH$—$COO$—$Ph$—$Ph$—$OR$ and its mixtures. Liquid crystal having positive or negative dielectric anisotropy may be used, depending on the application.

Particularly useful materials feature spherical or spheroidal microdroplets of liquid crystal having diameters of the order of magnitude of the pitch length of the liquid crystal or less. Such droplets form spontaneously if phase separation is performed under appropriate conditions. For example, a cross-linking agent may be added to the solution of liquid crystal and polymer, and cross-linking of the polymer phase initiated at an appropriate time to limit the growth of the liquid crystal droplets. Droplet size may also be controlled by heating a phase separated light modulating material in order to redissolve the liquid crystal and polymer, and then cooling the solution at a controlled rate in order to reinduce phase separation. These and other techniques for controlling the size and shape of liquid crystal microdroplets formed during phase separation are discussed in U.S. Pat. No. 4,673,255, the disclosure of which is incorporated by reference.

When phase separation of a ferroelectric smectic material occurs in the presence of a force promoting the alignment of the liquid crystal in the microdomains, such as an external electromagnetic field, applied shear, temperature gradient or a combination thereof, the liquid crystal assumes a geometry featuring parallel layers analogous to bookshelf geometry in thin films of the liquid crystal. (For convenience, the parallel layer geometry without twist in microdomains will also be referred to as "bookshelf" geometry.") If the anchoring between the liquid crystal and polymer is sufficiently weak, the microdomains may be switched bistably or multistably, depending on the smectic phase. Several switching modes, including normally scattering, normally transmitting and bistable modes, are possible depending on the composition of the material and the direction of the alignment promoted by the force applied to the material during, or after, phase separation.

Preferably, the materials modulate light by means of one of two mechanisms. In "scattering-transmissive" devices, the effective index of refraction of the liquid crystal is matched to an index of refraction of the polymer in one alignment of the liquid crystal, and mismatched with that refractive index of the polymer in another alignment of the liquid crystal. When the alignment of the liquid crystal is such that the effective indices of refraction of the liquid crystal and polymer are matched, incident light is transmitted through the material. On the other hand, when the alignment of the liquid crystal is such that the effective indices of refraction of the liquid crystal along the cell axis (perpendicular to the substrates) and polymer differ significantly, incident light is scattered.

In the "birefringent" mode, the index of refraction of the polymer and the index of refraction of the liquid crystal along the cell axis match. The liquid crystal film thickness and the orientation of the liquid crystal in the microdroplets are selected to rotate the polarization direction of the incident beam by a substantial angle as the light traverses through the cell. The orientation of the polarizer on the one side of the cell and the analyzer on the other side are adjusted to give the minimum transmission in one of the two orientations of the liquid crystal. The other orientation, then, corresponds to maximum transmission.

In both modes, the boundary conditions and the electrical properties of the liquid crystal can be selected to form a monostable, bistable or multistable device. Applications of such devices includes high resolution display devices, optical computing, optical data storage and optical communications.

One object of the invention is the formation of improved light modulating materials comprising microdomains of ferroelectric liquid crystals dispersed in a polymer medium. Still other features and advantages and a full understanding of the invention will become apparent to those skilled in the art from the following description of the best modes and the accompanying drawing.

DETAILED DESCRIPTION OF THE PREFERRED EMBODIMENT

Figure 1A:
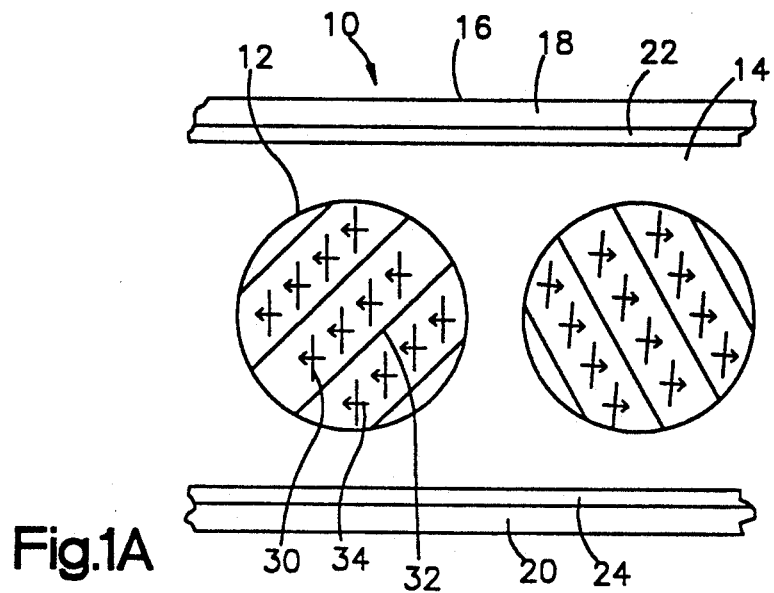
FIGS. 1A and 1B are schematic cross-sectional views showing one embodiment of the material in an as-formed (or, in the case of monostable materials, a field-OFF condition) and a field-ON condition, respectively.

FIGS. 1A–2C illustrate various embodiments of a light modulating material comprising microdomains of ferroelectric smectic liquid crystal formed in a medium of light transmissive polymer by phase separation from solution with the polymer or a prepolymer. For example, FIGS. 1A and 1B illustrate a shutter or display 10 comprising a light modulating material in which droplets 12 of the liquid crystal form in a polymer medium 14 during phase separation in a magnetic field normal to a viewing surface 16 of the material. The device 10 includes, in addition to the light modulating material, transparent substrates 18, 20 (preferably of glass) having transparent electrodes 22, 24 (preferably of indium-tin-oxide) deposited on inner surfaces of the substrates facing the polymer medium 14.

As shown schematically in FIG. 1A, solidifying the medium 14 in a magnetic field perpendicular to the viewing surface 16 forces the liquid crystal molecules 30 in the microdomains 12 to align parallel to the magnetic field. The smectic planes 32 and the electrical dipoles 34 of the liquid crystal 12 align randomly from microdomain to microdomain. If the liquid crystal and polymer are selected such that an index of refraction of the polymer is approximately equal to the index of refraction of the liquid crystal parallel to the long molecular axis, the device 10 in an as-formed state is optically homogeneous and transmissive along a direction perpendicular to the viewing surface 16. The scattering of light incident along a direction oblique to the viewing surface 16 of the device 10 (i.e., haze) can be reduced if the medium 14 is birefringent and the ordinary and extraordinary indices of refraction of the polymer are approximately equal to the indices of refraction of the liquid crystal parallel and perpendicular to the long molecular axis.

For liquid crystalline materials with positive dielectric anisotropy, a relatively weak DC voltage difference generated between the transparent electrodes 22 and 24 realigns the electrical dipoles 34 perpendicular to the viewing surface 16. As shown schematically in FIG. 1B, the molecular long axes of the molecules 30 in the microdomains 12 are now randomly aligned from microdomain to microdomain. The effective indices of refraction of the microdomains 12 along the direction perpendicular to the viewing direction 16 are no longer approximately equal to the effective index of refraction of the polymer medium 14. This mismatch of the indices of refraction gives rise to a strong Rayleigh scattering of incident light. The optical contrast between the light transmissive as-formed state and the light scattering state enables the device to modulate light.

If the liquid crystal and polymer are selected such that the liquid crystal phase in the microdomains 12 strongly anchors at the surfaces of the microdomains, the liquid crystal will return spontaneously to the light transmissive as-formed state shown in FIG. 1A when the voltage difference across the transparent electrodes 22, 24 is removed. By this means, a monostable "normally transmitting" (or "reverse mode") device is formed. Depending on the materials used, the switching time for this devices may be at least approximately two orders of magnitude less than the typical switching times of comparable devices using polymer dispersed nematic liquid crystal.

Figure 1B:
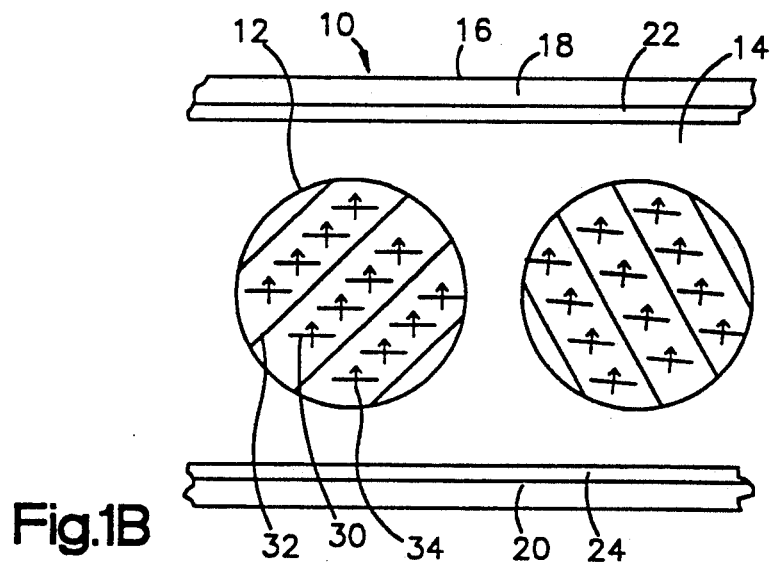

A different selection of liquid crystal and polymer such that the liquid crystal in the microdomains 12 weakly anchor at the surfaces of the microdomains results in a device which will remain in the scattering state shown in FIG. 1B even after the voltage difference between the electrodes 22, 24 is removed. A high frequency AC field or, in the case of liquid crystal materials with low polarization density, a relatively high DC field across the electrodes 22, 24 realigns the molecules 30 back to the as-light transmissive as-formed state shown in FIG. 1A. (The strength of a DC field effective to realign the molecules 30 back to the state shown in FIG. 1A is determined by the relative strengths of the permanent and induced dipole moments.) By this means, a bistable device is formed. As with the normally transmitive device, the switching time for this devices may be at least approximately two orders of magnitude less than the switching times of typical polymer dispersed nematic liquid crystal devices. Neither the normally transmissive device nor the bistable device illustrated in FIGS. 1A and 1B require polarizers to modulate light.

For liquid crystalline materials with negative dielectric anisotropy, a DC voltage difference generated between the transparent electrodes 22 and 24 realigns the electrical dipoles 34 perpendicular to the viewing surface 16. As in the case of liquid crystals with positive dielectric anisotropy, the effective indices of refraction of the microdomains 12 along the direction perpendicular to the viewing direction 16 are then no longer approximately equal to the effective index of refraction of the medium 14, giving rise to scattering. Whether the device is monostable or bistable depends on whether the liquid crystal and polymer are such that the anchoring of the liquid crystal at the surfaces of the microdomains 12 is strong or weak.

Figure 2A:
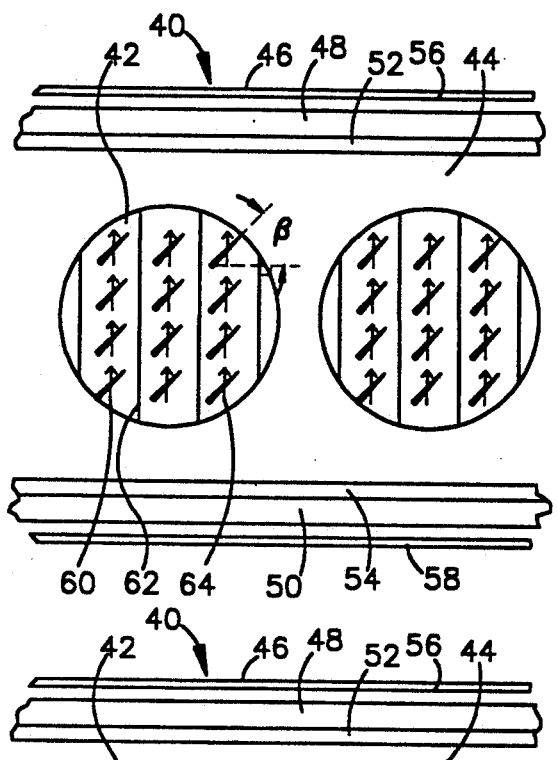
FIG. 2A is a schematic cross-sectional views of a second embodiment of the material in an as-formed (or, in the case of a monostable material, field-OFF) condition.
Figure 2B:
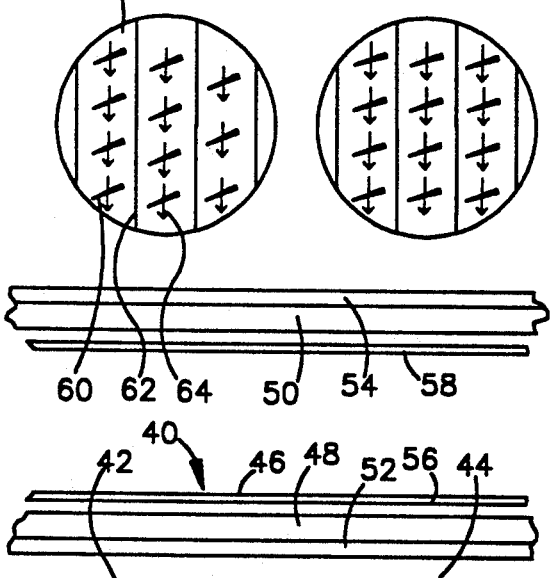
FIGS. 2B and 2C are schematic cross-sectional views of the embodiment of FIG. 2A in different field-ON conditions. While polarizers are shown in FIG. 2C for purposes of consistency with FIGS. 2A and 2B, they are unnecessary to the operation of a display making use of the condition shown in FIG. 2C.
Figure 2C:
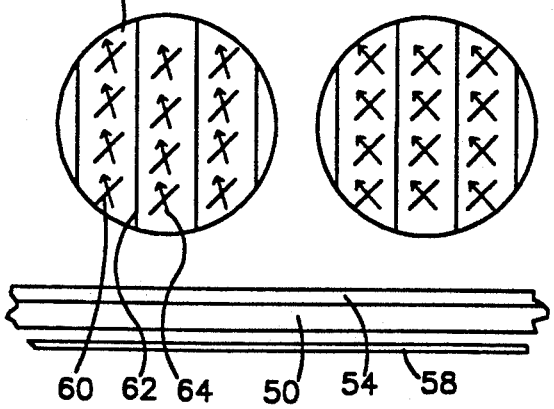

FIGS. 2A, 2B and 2C illustrate shutters or displays 40 comprising a light modulating material in which droplets 42 of the liquid crystal form in a polymer medium 44 during phase separation due to the influence of external fields (as discussed below). The device 40 includes, in addition to the light modulating material, transparent substrates 48, 50 having transparent electrodes 52, 54 deposited on inner surfaces of the substrates facing the polymer medium 44 and polarizers 56, 58 adjacent to opposite surfaces of the substrates. The polarizers 56, 58 can be rotated to have their axes parallel of perpendicular to each other, depending on requirements.

As shown schematically in FIG. 2A, solidifying the medium 44 in a magnetic field approximately parallel to the viewing surface 46 and a DC or slowly varying AC voltage perpendicular to the viewing surface 46 forces the molecule 60 in the microdomains 42 to align in "bookshelf" geometry such that the smectic planes 62 are perpendicular to the viewing surface 46. The electric dipoles 64 of the droplets 42 align perpendicularly to the viewing surface 46, while the molecules 60 themselves align at a tilt angle $\beta$ with respect to a line perpendicular to the smectic planes 62. (The molecules 64 are tilted out of the plane represented by the paper, as shown by the larger end of the "molecules" shown in FIG. 2A). If the liquid crystal and polymer are selected such that an index of refraction of the polymer is approximately equal to the effective index of refraction of the liquid crystal along the cell axis when its molecules are aligned at a tilt angle $\beta$, the light modulating material in an as-formed state transmits incident light and rotates the polarization direction of the incident light along a direction perpendicular to the viewing surface 46.

If, in addition, the liquid crystal and polymer are selected such that the liquid crystal phase in the microdomains 42 weakly anchors at the surfaces of the microdomains, applying a DC field in a direction opposite to that in which the medium 44 was solidified causes the molecules 60 to switch within the smectic layers so that the dipole moments 64 point in the opposite direction. In this alignment, shown schematically in FIG. 2B, the light modulating material also transmits and rotates the direction of polarization of the incident light along a direction normal to the viewing surface 46. The rotation of the polarization direction is opposite to that of the as-formed state. The liquid crystal may be returned to the alignment of FIG. 2A by again applying a DC field in the direction of the field in which the medium 44 solidified.

By rotating the polarization directions of the polarizers 56, 58, it is possible to maximize light transmission through the device 40 in one of the alignments shown in FIGS. 2A, 2B and minimize light transmission through the device in the other alignment. By this means, a "birefringence" mode device is formed. The relative orientations of the polarizers for obtaining maximum contrast is dependent on factors including the birefringence of the smectic phase, the thickness of the light modulating material, and the tilt angle of the liquid crystal. Advantages of such birefringence mode devices include ultra-high speed bistable switching a high contrast. One disadvantage is low light throughput due to the use of polarizers.

Alternatively, if the liquid crystal and polymer are selected such that the liquid crystal has positive dielectric anisotropy and the liquid crystal phase in the microdomains 42 strongly anchors at the surfaces of the microdomains, generating a strong DC voltage across the electrodes 52, 54 induces a realignment of the liquid crystal molecules toward a direction nearly perpendicular to the viewing surface 46. The degree of realignment is dependent on the interaction energy of the permanent dipole, the magnitude of which is dependent on the first power of the electric field strength, and of the induced dipole, the magnitude of which is dependent on the second power of the electric field strength. In this realigned state, shown schematically in FIG. 2C, the effective indices of refraction of the microdomains 42 along the direction perpendicular to the viewing direction 46 are no longer approximately equal to the effective index of refraction of the medium 44. This mismatch of the indices of refraction gives rise to a strong Rayleigh scattering of incident light. When the strong DC field is removed, the liquid crystal spontaneously returns to the alignment shown in FIG. 2A. By this means a scattering-transmissive device may be formed.

While polarizers 56, 58 are shown in FIG. 2C for purposes of consistency with FIGS. 2A and 2B, the light scattering occurs in the state shown in FIG. 2C even when unpolarized light is incident on the medium 44. In fact, the contrast and the light throughput between the light transmitting state of FIG. 2A and the light scattering state of FIG. 2C would increase if the polarizers were removed. While a scattering-transmissive device constructed using the material shown in FIGS. 2A and 2C having polarizers such as those shown at 56, 58 would be operative, such a device would preferably have no polarizers.

Devices operating in scattering-transmissive or bistable modes similar to those illustrated in FIGS. 1A and 1B may also be formed by solidifying the medium 14 in the presence of an DC or AC electric field. Alternatively, devices operating in the scattering-transmissive or birefringence modes discussed in connection with FIGS. 2A, 2B and 2C may be formed by shearing the light modulating material while keeping the liquid crystal in either a smectic A or smectic C phase by heating, or by solidifying the medium 44 in the presence of a temperature gradient parallel to the viewing surface 46. Depending on the materials, the circumstances in which the polymer is solidified and manner of aligning the liquid crystal, the microdomains may be non-spherical (e.g. take the form of spheroids rather than spheres.) This difference in shape is expected to impact on the switching behavior of the material and can be exploited to improve the operation of the device.

All of the above discussion, although framed in terms of a device utilizing smectic C* liquid crystal, is applicable also to devices using smectic F*, I*, G* and H* phases. Since these phases are capable of more than two stable orientation when aligned in bookshelf geometry, it is anticipated that devices using these materials will be capable of multistable switching in a preferred configuration.

The alignment may be performed when the solution of liquid crystal is first formed and solidified. Alternatively, the alignment may be performed by heating a material already containing dispersed microdomains of ferroelectric smectic liquid crystal and then resolidifying the medium in the presence of an induced force to promote the alignment of the liquid crystal.

The preferred embodiment of the invention is further exemplified by the following non-limiting example:

The ferroelectric material ZLI-3234, available from E. Merck of Darmstadt, Germany, was dissolved with polymethylmethacrylate ["PMMA"] in chloroform in the following proportions:
ZLI-3234 0.42 g
PMMA 0.28 g
$CHCl_3$ 6.3 g The solution was put in a glass tube and mixed with an agitator for ten minutes. Spacers of 5 μm diameter were added to this mixture to provide uniform cell spacing. The solution was coated on one indium-tin-oxide ["ITO"] coated glass plate with a barrier layer of $SiO_2$. The glass plate was left overnight to allow the solvent to evaporate, leaving a thin layer comprising droplets of liquid crystal dispersed in transparent polymer. The second plate was put on top of the coated one and the two were clamped together. The cell was heated to 150° C., put under a pressure of 20 psi in a hot press, and then cooled at a rate of ~1° C./min to 30° C.

The $SiO_2$ was removed from small areas of the glass plates outside the cells and wire leads were soldered to the ITO surface with indium metal. An electrical signal comprising alternating positive and negative square pulses of variable period and amplitude was applied and the switching characteristics of the cell observed under a polarizing microscope.

The observations were made while changing the amplitude of the electrical pulses having amplitudes from 0 volts to 25 volts, and pulse durations from 10 Hz to 100 Hz. Almost 80% of the microdroplets formed according to the procedure set forth in the last two paragraphs were found to respond to the electrical pulses. Nearly 10–20% of the droplets were identified to be switching bistably. The threshold voltage for various droplets varied from 5 volts to 25 volts, demonstrating the possibility of grey scale in such devices. The bistability of the ON and OFF states was confirmed by removing the leads from the source of the electrical signal and shorting the leads to remove any charge left over on the cell plates. Shorting the leads did not affect the state of the droplets identified to be bistable as they remained in the state in which they were when the leads were disconnected. A large fraction of other droplets were found to change their optical appearance but did not appear to switch when the electrical pulses were applied, because their optical axes were in the wrong orientation (for the experimental set-up) to exhibit bistability.

The bistable droplets appeared to switch at a frequency of at least 100 Hz. It is believed that the actual switching time was much shorter (~100 μs) as specified by the manufacturer of the liquid crystal for bulk samples, but the experiment was not designed to test switching at such high speeds.

Many modifications and variations of the invention will be apparent to those skilled in the art in light of the foregoing disclosure. Therefore, it is to be understood that, within the scope of the appended claims, the invention can be practiced otherwise than has been specifically shown and described.

We claim:

1. A light modulating material defining a viewing surface, comprising microdomains of a ferroelectric smectic liquid crystal phase dispersed in a light transmissive polymer medium, wherein an index of refraction of the polymer medium is approximately equal to an effective index of refraction along an angle complementary to the tilt angle of the liquid crystal.

2. A light modulating material according to claim 1 wherein the microdomains are spheroidal.

3. A light modulating material according to claim 1 wherein the microdomains are spherical.

4. A light modulating material according to claim 1 wherein the liquid crystal phase is dispersed as droplets in said polymer medium and weakly anchored at the boundaries of the droplets so as to promote multistable switching of the liquid crystal.

5. A light modulating material according to claim 4 wherein the liquid crystal phase is weakly anchored at the boundaries of the droplets so as to promote bistable switching of the liquid crystal.

6. A light modulating material according to claim 1 wherein the polymer medium is composed of an optically isotropic polymer phase.

7. A light modulating material according to claim 1 wherein the liquid crystal phase is a smectic C* phase.

8. A bistable light modulating device including a light modulating material comprising microdomains of a ferroelectric smectic liquid crystal phase dispersed in a light transmissive polymer medium, wherein an index of refraction of the polymer medium is approximately equal to an effective index of refraction along an angle complementary to the tilt angle of the liquid crystal, said material being positioned between two polarizers and between electrodes constructed and arranged to impose electric fields across the material in a direction parallel to its thinnest dimension.

9. A light modulating material defining a viewing surface, comprising microdomains of a ferroelectric smectic liquid crystal phase dispersed in a light transmissive polymer medium, wherein the microdomains have a characteristic length no greater than ten times the pitch length of the ferroelectric smectic liquid crystal, and the ferroelectric liquid crystal molecules throughout each of said domains are aligned generally parallel to each other in smectic planes which are themselves parallel to each other.

10. A light modulating material according to claim 9 wherein the alignment of liquid crystal directors within layers is not twisted from layer to layer.

* * * * *

UNITED STATES PATENT AND TRADEMARK OFFICE
CERTIFICATE OF CORRECTION

PATENT NO : 5,321,533
DATED : June 14, 1994
INVENTOR(S) : Satyendra Kumar It is certified that error appears in the above-identified patent and that said Letters Patent is hereby corrected as shown below:

Column 1, line 4 insert the following:

---The United States government has a paid-up license in this invention and may have the right in limited circumstances to require the patent owner to license others on reasonable terms as provided for by the terms of contract DMR89-20147, awarded by the National Science Foundation.---

Signed and Sealed this

Twenty-ninth Day of June, 1999

*Attest:*

Q. TODD DICKINSON

*Attesting Officer*   *Acting Commissioner of Patents and Trademarks*